US009777502B2

(12) United States Patent
Curlander et al.

(10) Patent No.: US 9,777,502 B2
(45) Date of Patent: Oct. 3, 2017

(54) MULTI-LEVEL FULFILLMENT CENTER FOR UNMANNED AERIAL VEHICLES

(71) Applicant: Amazon Technologies, Inc., Seattle, WA (US)

(72) Inventors: James Christopher Curlander, Bellevue, WA (US); Asaf Gilboa-Amir, Seattle, WA (US); Lauren Marie Kisser, Seattle, WA (US); Robert Arthur Koch, Issaquah, WA (US); Ricky Dean Welsh, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/975,618

(22) Filed: Dec. 18, 2015

(65) Prior Publication Data
US 2017/0175413 A1    Jun. 22, 2017

(51) Int. Cl.
*E04H 14/00*    (2006.01)
*B64F 1/10*    (2006.01)
(Continued)

(52) U.S. Cl.
CPC ............. *E04H 14/00* (2013.01); *B64F 1/025* (2013.01); *B64F 1/10* (2013.01); *B64F 1/32* (2013.01);
(Continued)

(58) Field of Classification Search
CPC .. E04H 1/04; E04H 1/06; E04H 1/005; E04H 3/02; E04H 5/02; E04H 14/00;
(Continued)

(56) References Cited

U.S. PATENT DOCUMENTS 3,226,889 A * 1/1966 Debes ...................... E04H 1/04
52/236.1
3,543,455 A * 12/1970 Walsh ...................... E04H 6/44
52/236.1
(Continued)

FOREIGN PATENT DOCUMENTS

AE    WO 2014080389 A2 *  5/2014  ............. A47G 29/14
CN         103274226 B  *  1/2015
(Continued)

OTHER PUBLICATIONS

Architecture.Org—Way Back Machine snapshot of Apr. 1, 2015 Presidential Libraries: Designing A Legacy Obama Drone Aviary—Design Team: Ann Lui and Craig Reschke.*
(Continued)

*Primary Examiner* — Joshua J Michener
*Assistant Examiner* — Matthew Gitlin
(74) *Attorney, Agent, or Firm* — Lee & Hayes, PLLC

(57) ABSTRACT

A multi-level (ML) fulfillment center is designed to accommodate landing and takeoff of unmanned aerial vehicles (UAVs), possibly in an urban setting, such as in a densely populated area. Unlike traditional fulfillment centers, the ML fulfillment centers may include many levels (i.e., stories, floors, etc.) as permitted under zoning regulations for respective areas. The fulfillment center may have one or more landing locations and one or more deployment locations to accommodate UAVs, which may delivery at least some of the items from the fulfillment center to locations associated with customers.

20 Claims, 11 Drawing Sheets

(51) Int. Cl.
*B64F 1/02* (2006.01)
*B64F 1/32* (2006.01)

(52) U.S. Cl.
CPC .... *B64C 2201/128* (2013.01); *B64C 2201/20* (2013.01)

(58) Field of Classification Search
CPC ..... E04H 6/00; E04H 6/44; B64F 1/02; B64F 1/04; B64F 1/22; B64F 1/32; B64F 1/36; B64F 1/025; B64F 1/10; B64C 2201/20; B64C 2201/128; B65G 67/00
USPC .. 52/234, 236.1, 236.2, 236.3, 236.5, 236.7; 414/584
See application file for complete search history.

(56) References Cited

U.S. PATENT DOCUMENTS

| | | | | |
|---|---|---|---|---|
| 3,670,464 | A * | 6/1972 | Cutter | E04B 1/346 244/114 R |
| 3,708,934 | A * | 1/1973 | Jones | E04H 6/44 52/236.1 |
| 3,852,924 | A * | 12/1974 | Levenson | E04H 1/02 52/234 |
| 4,098,039 | A * | 7/1978 | Sutelan | E04H 1/04 52/236.1 |
| 4,434,595 | A * | 3/1984 | de Brabant | E04H 1/04 52/236.2 |
| 4,598,515 | A * | 7/1986 | Diana | E04B 1/04 52/236.1 |
| 4,726,316 | A * | 2/1988 | Bruns | B63B 35/44 114/125 |
| 4,974,795 | A * | 12/1990 | Christol | E01F 3/00 244/114 R |
| 5,377,465 | A * | 1/1995 | Kobori | E04B 1/3404 52/236.3 |
| 5,426,907 | A * | 6/1995 | Franklin | B66C 23/203 212/175 |
| 5,528,866 | A * | 6/1996 | Yulkowski | E04H 1/04 52/236.3 |
| 5,860,258 | A * | 1/1999 | Faith | E04H 9/02 52/236.2 |
| 6,023,665 | A * | 2/2000 | Millgard | |
| 7,497,055 | B2 * | 3/2009 | Stewart | E04H 6/10 52/169.4 |
| 7,921,609 | B2 * | 4/2011 | Kordelin | B63B 29/025 114/71 |
| 8,297,014 | B2 * | 10/2012 | Hanumantrao | E04B 1/3404 52/236.4 |
| 8,511,607 | B2 * | 8/2013 | Robinson | B64F 1/06 244/63 |
| 8,584,349 | B2 * | 11/2013 | Scannon | G05B 19/4188 29/722 |
| 9,056,676 | B1 * | 6/2015 | Wang | B64F 1/00 |
| 9,244,147 | B1 * | 1/2016 | Soundararajan | |
| 9,387,940 | B2 * | 7/2016 | Godzdanker | B64F 1/125 |
| 9,394,060 | B2 * | 7/2016 | Brody | B64F 1/00 |
| 9,505,493 | B2 * | 11/2016 | Borko | B64C 39/024 |
| 9,527,605 | B1 * | 12/2016 | Gentry | B64F 1/12 |
| 9,561,871 | B2 * | 2/2017 | Sugumaran | B64C 25/32 |
| 2003/0050732 | A1 | 3/2003 | Rivalto | |
| 2006/0162267 | A1 * | 7/2006 | Van Croonenborgh | E04H 6/287 52/236.3 |
| 2009/0107063 | A1 * | 4/2009 | Pierson | E04H 6/005 52/236.1 |
| 2014/0010619 | A1 | 1/2014 | Dor-El et al. | |
| 2014/0061377 | A1 | 3/2014 | Smith | |
| 2014/0137486 | A1 * | 5/2014 | Driess | E04H 5/02 52/30 |
| 2014/0252168 | A1 | 9/2014 | Brody | |
| 2015/0158599 | A1 * | 6/2015 | Sisko | B64F 1/32 244/114 R |
| 2015/0175276 | A1 * | 6/2015 | Koster | B64F 1/32 244/114 R |
| 2015/0183528 | A1 * | 7/2015 | Walsh | B64F 1/32 701/3 |
| 2015/0211249 | A1 * | 7/2015 | Driess | E04H 5/02 52/30 |
| 2015/0336669 | A1 * | 11/2015 | Kantor | G01C 21/20 701/3 |
| 2016/0011592 | A1 * | 1/2016 | Zhang | B64C 39/024 701/2 |
| 2016/0039540 | A1 * | 2/2016 | Wang | B64F 1/36 244/114 R |
| 2016/0209839 | A1 * | 7/2016 | Hoareau | G05D 1/0027 |
| 2016/0244187 | A1 * | 8/2016 | Byers | B64F 5/0045 |
| 2016/0257423 | A1 * | 9/2016 | Martin | B64F 1/00 |
| 2016/0340006 | A1 * | 11/2016 | Tang | B63C 9/01 |

FOREIGN PATENT DOCUMENTS

| | | | |
|---|---|---|---|
| DE | CA 2046217 A1 * | 1/1992 | ............. E04H 1/04 |
| EP | 1925762 | 5/2008 | |
| GB | 1445001 | 8/1976 | |
| IN | WO 2009078032 A1 * | 6/2009 | .......... E04B 1/3404 |
| KR | 101527210 | 6/2015 | |
| TW | M462714 | 10/2013 | |
| WO | WO2014054039 | 4/2014 | |
| WO | WO2015117216 | 8/2015 | |

OTHER PUBLICATIONS

PCT Search Report and Written Opinion mailed Mar. 2, 2017 for PCT Application No. PCT/US16/67287, 15 pages.

* cited by examiner

CROSS SECTION A-A

DETAIL A

CROSS SECTION B-B

DETAIL B

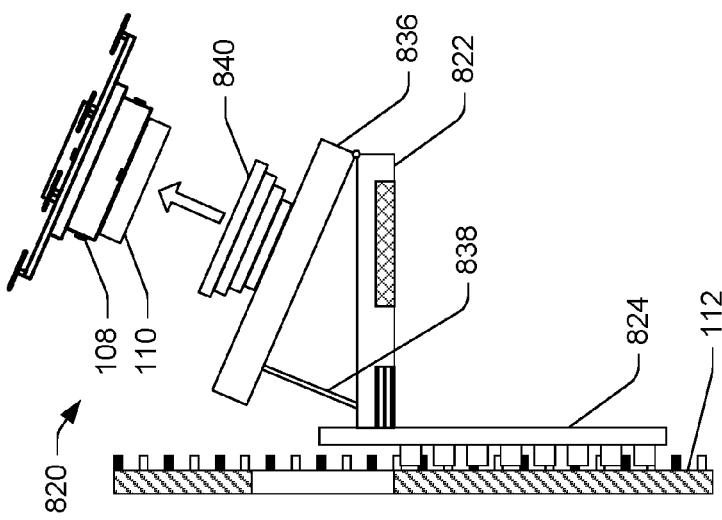
FIG. 8E CROSS SECTION C-C
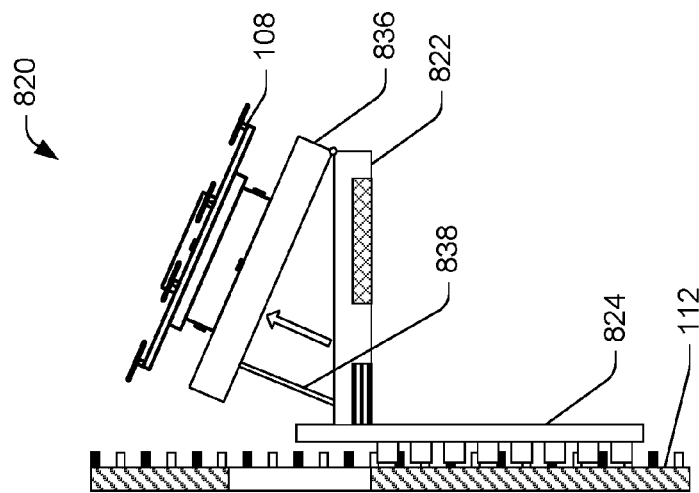
FIG. 8D CROSS SECTION C-C
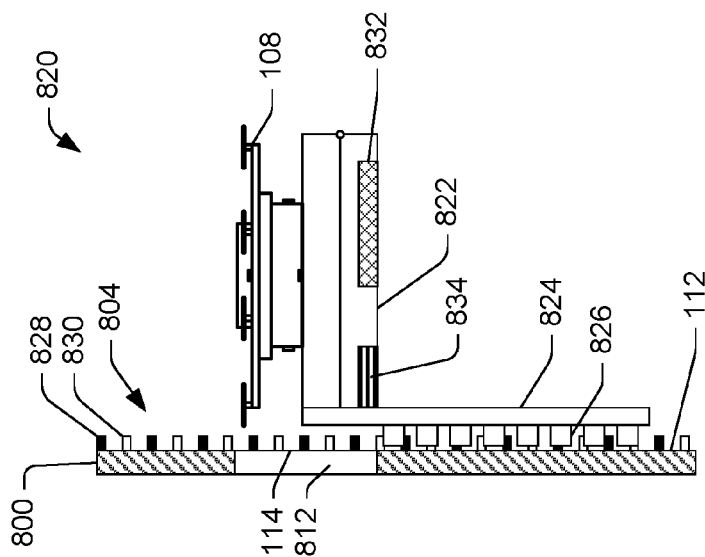
FIG. 8C CROSS SECTION C-C

MULTI-LEVEL FULFILLMENT CENTER FOR UNMANNED AERIAL VEHICLES

BACKGROUND

Fulfillment centers are typically large-volume single-floor warehouse buildings used to temporarily store items prior to shipment to customers. Often, due to their large footprint, these buildings are located on the outskirts of cities where space is available to accommodate these large buildings. These locations are not convenience for deliveries into cities where an ever-increasing number of people live. Thus, there is a growing need and desire to locate fulfillment centers within cities, such as in downtown districts and densely populated parts of the cities. By locating the fulfillment centers within the cities, items may be more quickly delivered to the growing population of people that live in the cities, as well as the large population of people who work in the cities.

Conventionally, items have been delivered from fulfillment centers by common carriers, which travel from the fulfillment centers located outside of the city into the cities to the customer's residence or designated delivery location. Smaller businesses, such as restaurants, sometimes use bicycle delivery and walking delivery of items to customers that are located near the business. More recently, additional types of deliveries have grown in popularity and feasibility, such as delivery by unmanned aerial vehicles (UAVs) and delivery by short-term hired ground vehicle drivers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8C is a side elevation view of a cross section from FIG. 8B of a moveable UAV platform coupled to the exterior of the fulfillment center.

FIGS. 8D and 8E show deployment of a UAV using a tilt action of the moveable UAV platform.

DETAILED DESCRIPTION

Figure 1A:
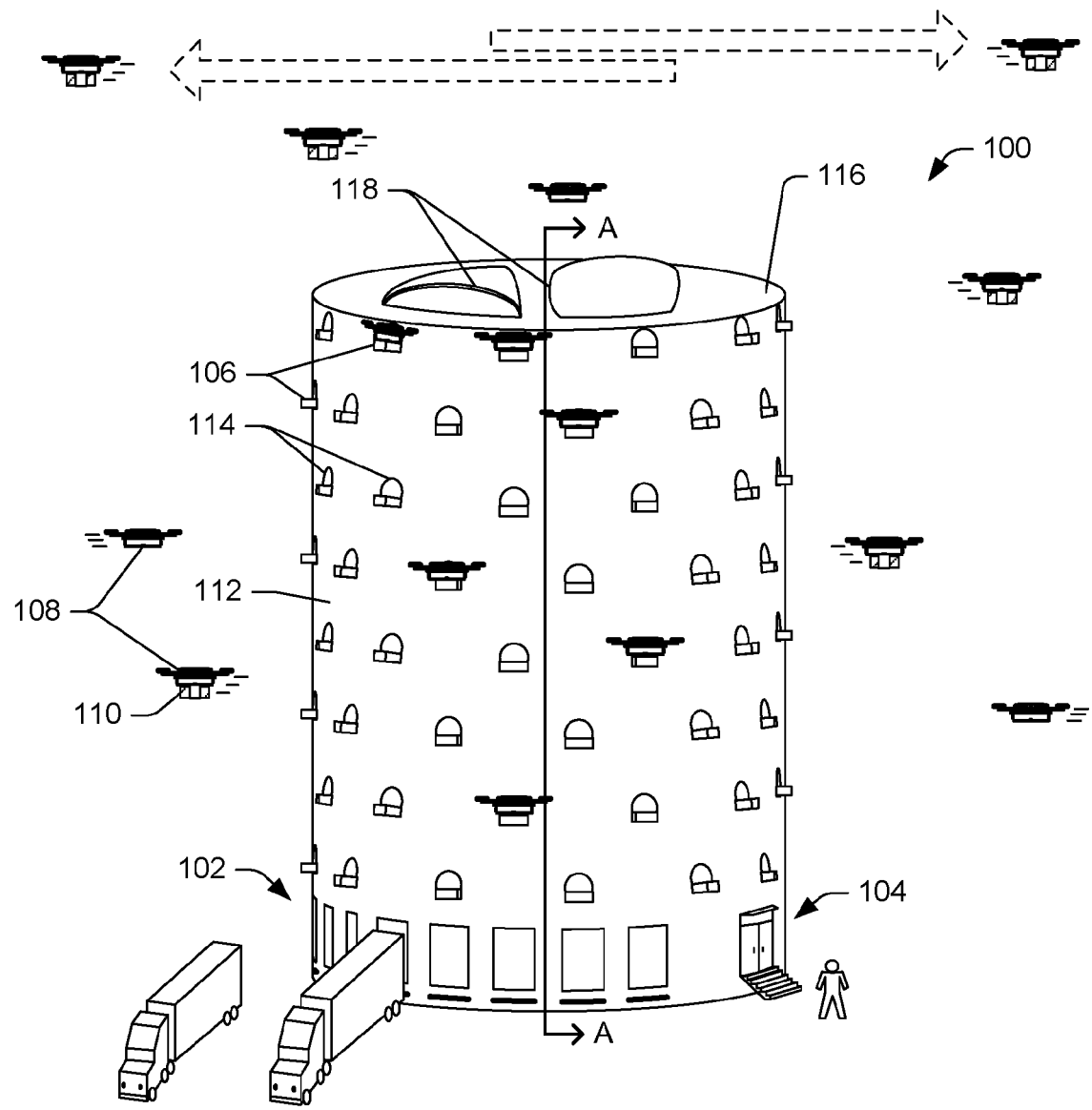
FIG. 1A is an isometric view of an illustrative multi-level fulfillment center designed to accommodate landing and takeoff of unmanned aerial vehicles (UAVs).

This disclosure is directed to multi-level (ML) fulfillment centers designed to accommodate landing and takeoff of unmanned aerial vehicles (UAVs). The fulfillment centers may be located in downtown districts and/or other densely populated urban areas. Unlike traditional fulfillment centers, the ML fulfillment centers may include many levels (i.e., stories, floors, etc.) as permitted under zoning regulations for respective areas. The fulfillment center may have one or more landing locations and one or more deployment locations to accommodate UAVs, which may delivery at least some of the items from the fulfillment center to locations associated with customers.

Freight (e.g., bulk merchandise, supplies, etc.) may be delivered to the fulfillment center using conventional ground transit, such as by semi-trailer and tractor. Freight may also be delivered using other modes of transit, such as by rail, air drop, maritime vessel, and/or other techniques that enable safe and reliable delivery of freight to the fulfillment center in accordance with local ordinances and customs.

The ML fulfillment centers may support traditional deliveries by common carriers that use ground vehicles to deliver items to customers. The fulfillment centers may also include a self-service space where customers can pick up items. The items may be temporarily stored in lockers or otherwise made available to customers for self-pick-up.

Like traditional fulfillment centers, the ML fulfillment centers may include shelves and other storage areas to temporarily stow items that are eventually picked for shipment to customers. The processes of stowing items and picking items may be performed at least partly by use of robotic devices that assist human operators and/or operate autonomously to perform at least some tasks. In some embodiments, the robotic devices may transport UAVs within the ML fulfillment center, such as from a landing location to a deployment location, as well as to other locations such as a service location, a battery replacement location, a payload securement location, and so forth. In some embodiments, the UAVs may fly at least partially within the fulfillment center, such as from an entrance location to a landing location within the fulfillment center or from a deployment location to an exit location from the fulfillment center.

The ML fulfillment center may be used to fulfill hundreds or thousands of orders each day using UAVs for at least some of the orders. Therefore, the ML fulfillment center is configured to support a large volume of UAVs that continually pick up deliveries from the ML fulfillment center and then deploy toward a destination for the particular delivery. The ML fulfillment center may include services to charge batteries of the UAVs, inspect and/or service the UAVs, and/or perform other operations for the UAVs between flights. The ML fulfillment center may also be equipped with a central command to control at least some operations of the UAVs, which may be analogous to a flight controller at an airport, which manages incoming and outgoing flights, as well as air traffic in nearby airspace.

In some embodiments, the ML fulfillment center may prioritize UAV interaction near a top level of the fulfillment center, which may have several benefits such as reduced noise near at a street level, closer proximity to a cruising altitude used by the UAVs during delivery, and centralized entry/exit points in the fulfillment center, which are secured. In some embodiments, UAV pods or other mechanisms may transport UAVs toward a top of the fulfillment center prior to deployment of the UAV to reduce power consumption of the UAV that climbs this altitude under self-powered flight. For example, the UAV pods may use internal elevators or may scale coupling features on an exterior of the fulfillment center to move a UAV upward before deployment of the UAV.

The fulfillment centers, devices, techniques, and systems described herein may be implemented in a number of ways. Example implementations are provided below with reference to the following figures.

FIG. 1A is an isometric view of an illustrative multi-level (ML) fulfillment center 100 designed to accommodate landing and takeoff of unmanned aerial vehicles (UAVs) that deliver items from the fulfillment center to customers. The ML fulfillment center 100 may be shaped similar to a high-rise office building, but may include many custom features to accommodate receipt of freight, access by UAVs, and access by people. The profile of the ML fulfillment center 100, as viewed from above, may be circular, rectangular, or have other shapes, as described below.

The ML fulfillment center 100 may include freight dock locations 102 near a bottom of the ML fulfillment center 100. The freight dock locations 102 may accommodate receipt of freight, such as bulk merchandise, supplies, and other items via trucks, rail deliveries, and/or other types of deliveries, possibly even by maritime vessels when the ML fulfillment center 100 is located proximate to a navigable body of water. The freight may be processed within the ML fulfillment center 100, such as stowed in designated locations, picked, and then boxed and/or otherwise packaged for delivery. In some embodiments, the freight dock locations 102 may support traditional deliveries by common carriers that use ground vehicles to deliver items to customers.

In some embodiments, the ML fulfillment center 100 may include a self-service location 104 for customers to pick-up items in person rather than have the items delivered to the customers. For example, the self-service location 104 may enable customers to obtain items with minimal delay. Items may be temporarily stored in the self-service location 104, such as in lockers or in a room accessible by one or more staff that provides the items to customers.

The ML fulfillment center 100 may include UAV platforms 106 configured to receive and deploy UAVs 108, which may carry packages 110 from the ML fulfillment center to destinations associated with customers. The UAV platforms 106 may be located on an exterior of the fulfillment center and/or in an interior of the fulfillment center, such as proximate to an exterior shell 112 and/or proximate to an internal airway. The UAV platforms 106 may include a UAV service site, which is used to service the UAV as discussed below, including loading the UAV with a package to be delivered to a customer. The internal airway may have direct access to a navigable airway (i.e., open air) that has a cruising zone (or cruising altitude) used by many of the UAVs during delivery of the packages 110 and during return flights back to the ML fulfillment center 100.

The exterior shell 112 may include apertures 114, which may enable the UAVs to gain entrance to and/or exit from the ML fulfillment center 100 and/or may enable loading UAVs that are external to the ML fulfillment center 100 with packages and/or other equipment (e.g., charged batteries and/or other supplies). The apertures 114 may be circular, rectangular, oval, polygon-shaped, or shaped in other ways to accommodate entry and exit of UAVs. The apertures 114 may be spaced apart from one another to enable takeoff and landing of UAV from a location proximate to the aperture without conflict with other UAVs. The apertures may be arranged about the exterior in a grid that provides at least a predetermined vertical spacing between vertically adjacent apertures and a horizontal spacing between horizontally adjacent apertures. The conflicts may include physical conflict or downwash resulting from UAVs flying nearby. In some embodiments, the UAVs may be subjected to external forces that assist the UAV in a launch, referred to herein as launch assist mechanisms and/or lift assist mechanisms, such as devices and techniques discussed in U.S. patent application Ser. No. 14/501,702 titled "Automated Aerial Vehicle Launch Assist" and filed on Sep. 30, 2014, which is incorporated herein by reference in its entirety. In some embodiments, a central command may manage arrival and departure of UAVS with respect to the specific locations of the apertures 114 such that UAVs are not flying at or near adjacent apertures at a same time, for example. In various embodiments, some apertures may be designated for entry of UAVs into the ML fulfillment center 100 while other apertures may be designated for exit of UAVs from the ML fulfillment center 100. Some apertures may only enable entry or exit of a single UAV at a time while other apertures may be configured to allow multiple UAVS to enter or exit, at a same time or one-after-another. For example, larger apertures may be used to accommodate multiple UAVS at once or one-after-another for entrance to the ML fulfillment center 100, exit from the ML fulfillment center 100, or both. Some apertures may be used to access the UAVs, but may not be configured to allow passage of UAVs through the apertures.

The apertures 114 may be secured by doors and/or other physical mechanisms to prevent unauthorized access, such as physical access, line of sight access (visual access), or both. Techniques and devices described in U.S. patent application Ser. No. 14/735,070 titled "Unmanned Aerial Vehicle Secure Egress and Ingress" and filed on Jun. 9, 2015, which is incorporated herein by reference in its entirety, may be used with the apertures to provide security for the ML fulfillment center 100. In some embodiments, apertures 114 may be located adjacent to a corresponding UAV platform of the UAV platforms 106. However, some UAV platforms may not be located proximate to an aperture, such as overflow UAV platforms used when no aperture is currently available for a UAV.

During operation, a UAV may land on the UAV platform 106 and power down. A controller may authenticate a UAV to determine if the UAV is authorized to access the ML fulfillment center 100. Authentication may include a one-way or bi-directional communication of information wirelessly between the controller and the UAV to positively identify the UAV and access permissions of the UAV. The aperture 114 may be opened when the UAV is authenticated and while the UAV is located at or near the platform. The UAV may be serviced, which may include inspecting the UAV, charging one or more batteries of the UAV and/or providing the UAV with a charged power source, and/or performing other services of the UAV, which may be performed while the aperture is open or closed. The UAV may then be coupled to a package to be delivered to a destination associated with a recipient. The package may be provided through the aperture when the aperture is open. Finally, the UAV may be deployed from the UAV platform to initiate the delivery by the UAV. In some embodiments, the UAV may enter through the aperture to gain access to an internal location within the ML fulfillment center 110.

In various embodiments, a roof 116 (e.g., a top level) of the ML fulfillment center 100 may accommodate some functions and interaction with the UAVs. The roof 116 may include passages 118 to enable UAV access to/from the ML fulfillment center 100 and/or access to/from the roof 116 by other devices, such as workers, robots, conveyers, and/or other objects, which may perform any number of operations such as servicing UAVs, loading UAVs with packages to be delivered, and so forth. The passages 118 may be secured from unauthorized access (e.g., physical access, line of sight access (visual access), etc.) using the same or similar techniques described above with respect to the apertures 114 and using the techniques and devices described in U.S. patent application Ser. No. 14/735,070 titled "Unmanned Aerial Vehicle Secure Egress and Ingress" and filed on Jun. 9, 2015, which is incorporated herein by reference in its entirety.

In some embodiment, the roof 116 may be used for expedited landings, such as by UAVs that have limited remaining power reserves or otherwise are in need of service. The roof 116 may also accommodate larger UAVs that may not be supportable by the UAV platforms 106 or are unable to fit through the apertures 114 (if/when the apertures are used for entry/exit of UAVs). The roof 116 may also support other equipment, such as heating, ventilating, and air conditioning (HVAC) equipment, communication equipment (e.g., antennas, controllers, etc.), and/or other devices or equipment.

Figure 1B:
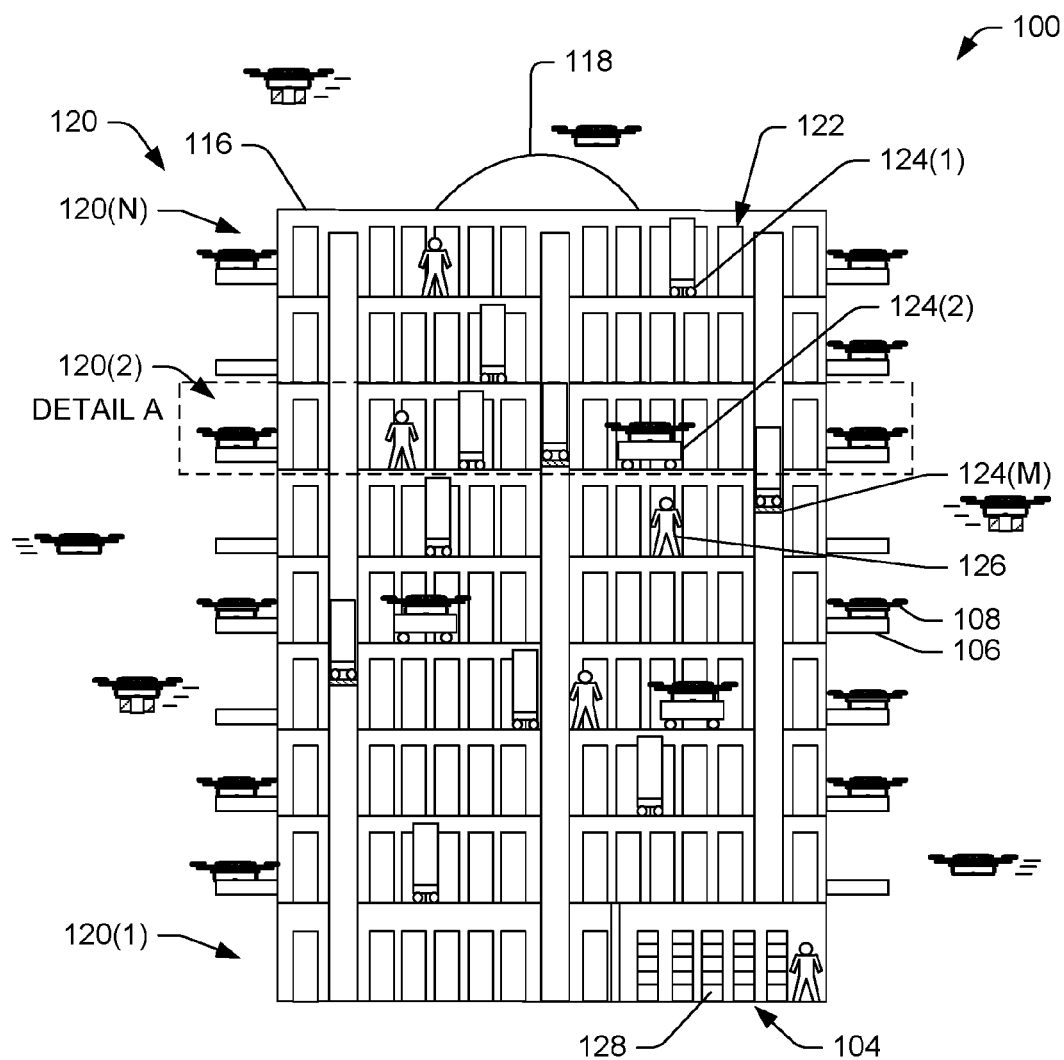
FIG. 1B is a side elevation view of a cross-section of the multi-level fulfillment center shown in FIG. 1A.

FIG. 1B is a side elevation view of a cross-section of the multi-level fulfillment center 100 shown in FIG. 1A, showing a simplified depiction of some of the inner workings of the ML fulfillment center 100. As shown in FIG. 1B, the ML fulfillment center 100 may include a plurality of levels 120 (e.g., floors, layers, etc.), which may span between a first level 120(1) and a top level 120(N) that is located below the roof 116. The first level 120(1), and possible other levels, may be located underground in some implementations. In various embodiments, a substantial amount of the operations and/or volume of the ML fulfillment center 100 may be located below ground level, possibly including freight receiving facilities. The first level 120(1) may include special facilities for receiving freight. However, other levels may include similar facilities depending on an entry point of the freight.

In some embodiments, some of the levels 120 may have a different height and/or volume of space than an adjacent level. For example, some levels may be used to transport UAVs about the ML fulfillment center 100, and thus may be relatively shorter in height than other levels (e.g., less than a conventional floor having a ceiling height of approximately 8 feet). Other levels may include a higher ceiling height, which may accommodate flight of UAVS within such levels, such as flight above locations where items are stowed.

The levels 120 may include storage locations 122, such as bins, racks, or other fixed or mobile devices for placing, at least temporarily, items to be delivered and/or other items for the ML fulfillment center 100. Robots 124(1), 124(2), . . . 124(M), human workers 126, or both, may occupy locations within the levels to stow items, pick items, and/or perform other item-related operations. The robots, the human workers, or both may also perform other operations, such as transport UAVs, inspect and/or service UAVs, and/or perform other non-item-based operations. The robots may include item transport robots 124(1), UAV transport robots 124(2), and elevator robots 124(M). The elevator robots 124(M) may be configured to move items, UVAs, and/or other objects between different floors. In some embodiments, multifunctional robots may perform some or all of these operations of the robots 124(1), 124(2), . . . 124(M). In some embodiments, the robots may perform some service of UAVs, such as charging batteries, swapping batteries, inspecting, cleaning, and/or other service operations. More advanced services operations may be performed by human workers. In some embodiments, the UAVs may fly or otherwise move within the ML fulfillment center 100 under their own power. For example, the UAVs may include wheels that allow them to roll from a first location proximate to a landing site to a second location proximate to a takeoff site, which may or may not be on a same level as the first location.

As discussed above, the ML fulfillment center 100 may include the self-service location 104 for customers to pick-up packages or items in person rather than have the items delivered to the customers. The items may be temporarily stored in lockers 128 in the self-service location 104, possibly by the robots used in the ML fulfillment center 100. The lockers may use revolving access codes that enable users to access items within the lockers 128.

Figure 1C:
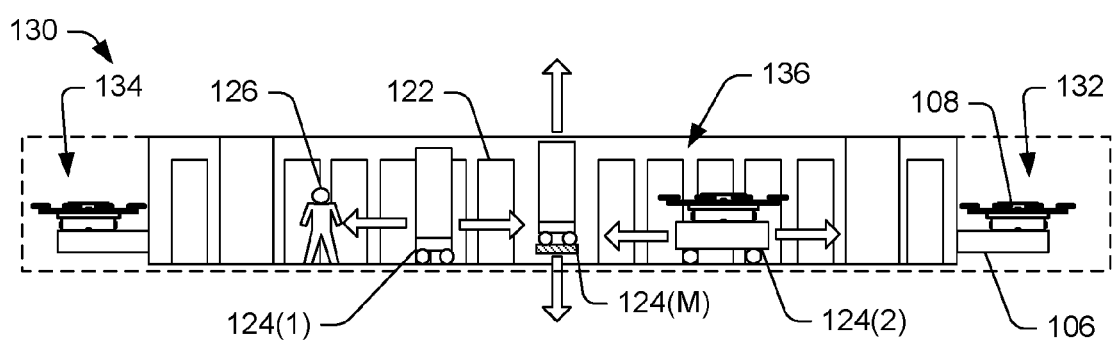
FIG. 1C is a side elevation view of a detailed view of an illustrative level of the multi-level fulfillment center 100 shown in FIG. 1B

FIG. 1C is a side elevation view of Detail "A" from FIG. 1B, showing detail of an illustrative level 130 the multi-level fulfillment center 100. As shown, items, robots, and/or the storage locations 122 may be located on the level 130, and may work in cooperation to create packages for delivery by the UAV to a destination associated with a customer. In some embodiments, a UAV may enter the ML fulfillment center 100 at the level 130 at a first location 132, such on the UAV platform 106, which may be located on the exterior of the ML fulfillment center 100 or inside the ML fulfillment center 100. The UAV may be transported, via a passage 136, to a second location 134, which may be another UAV platform 106. During the transit, between the first location 132 and the second location 134, the UAV may be charged or equipped with a charged battery (or other power source), be serviced and/or inspected, and be coupled to a package for delivery. In some embodiments, the UAV may obtain the package and/or items for the package while the UAV is within the ML fulfillment center 100, such as when the UAV is configured to pick items from the storage locations 122. One of the human workers 126 may perform an inspection of the UAV prior to deployment of the UAV, possibly by reviewing data collected from the UAV as well as visually inspecting the UAV.

Figure 2:
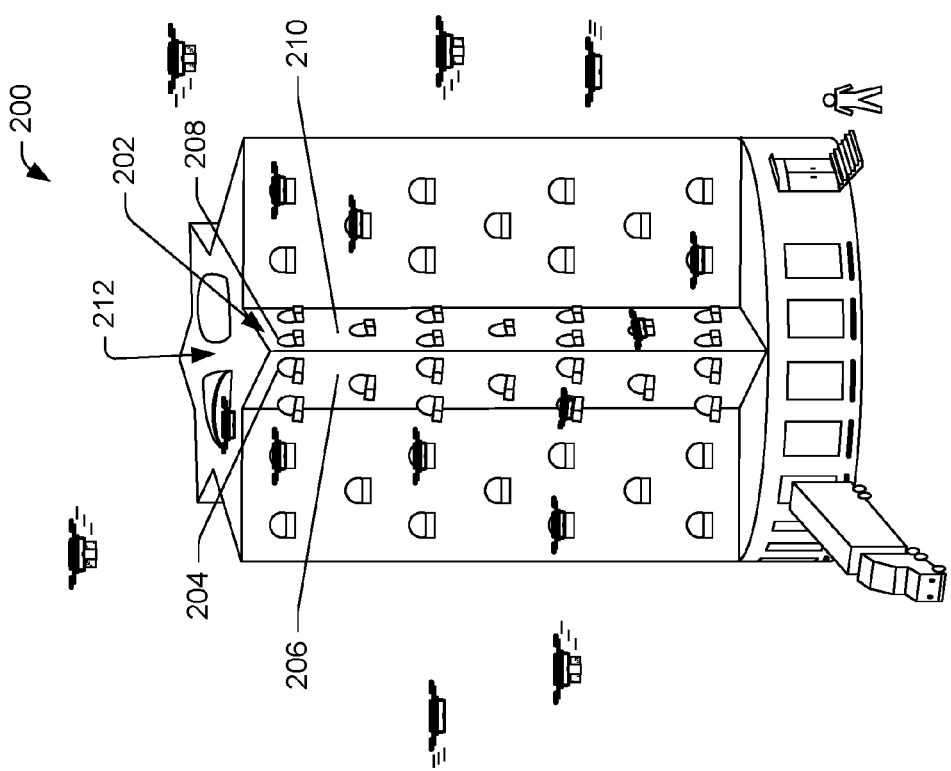
FIG. 2 is an isometric view of an illustrative multi-level fulfillment center having a hub and spoke profile as viewed from a top view. The hub and spoke profile increases external surface area usable to land and deploy UAVs from sides of the fulfillment center.

FIG. 2 is an isometric view of an illustrative multi-level fulfillment center 200 having a hub and spoke profile as viewed from a top view. The hub and spoke profile increases external surface area usable to land and deploy UAVs from sides of the fulfillment center. The ML fulfillment center 200 may include some or all of the features shown and described with reference to the ML fulfillment center 100, while having a different exterior profile.

In some embodiments, a spoke 202 (i.e., an arm extending outward from the hub) may include a UAV service site located between two apertures, such as a first aperture 204 on a first side 206 of the spoke 202 and a second aperture 208 on a second side 210 of the spoke 202. A UAV may enter the first aperture 204, proceed to be serviced and coupled to a package for delivery from the UAV operation site, and then deploy from the first aperture 206. In these embodiments, the same UAV operation site may be used to service multiple different UAVs (two in this example, but possibly more). In some embodiments, the UAV may land at the UAV operation site, and may deploy from a different aperture than the aperture used to enter the ML fulfillment center 200. The ML fulfillment center 200 may consolidate some or all of the item and package processing within a central core 212 of the ML fulfillment center 200. The packages may then be moved to the spokes, such as the spoke 202, for distribution by the UAVs to destinations associated with customers. Although the hub and spoke design shown in FIG. 2 resembles a star shape, other hub and spoke profiles may be used that include radiuses or rectangular shaped spokes that extend outward from the hub.

Figure 3:
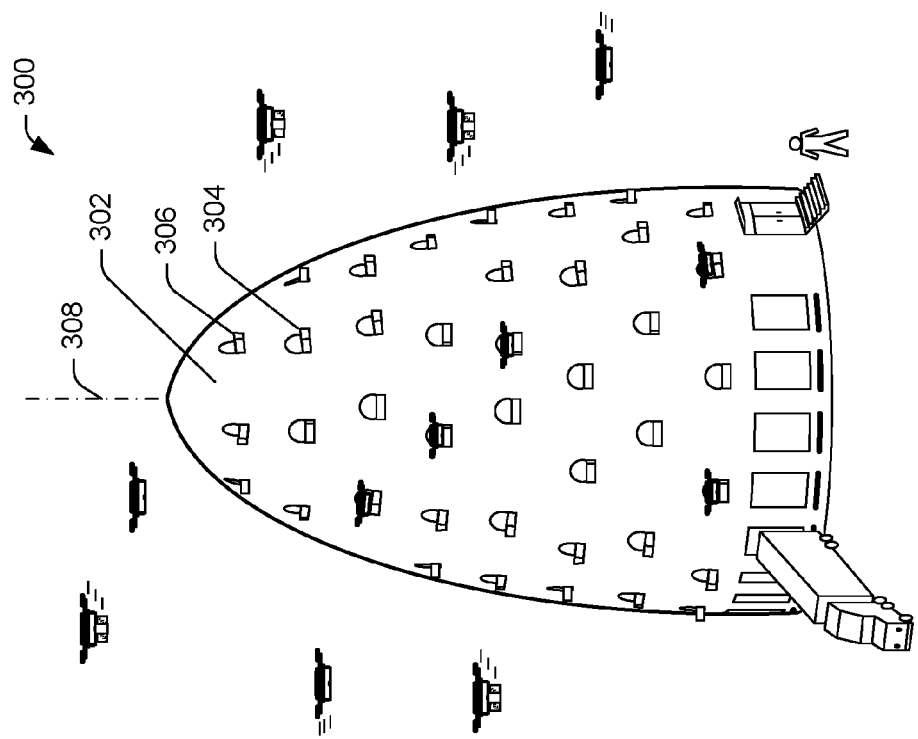
FIG. 3 is an isometric view of an illustrative multi-level fulfillment center having an exterior that converges toward the top of the fulfillment center. The converging exterior enables placement of landing and deployment surfaces about the exterior that have relatively clear airspace above each surface.

FIG. 3 is an isometric view of an illustrative multi-level fulfillment center 300 having a converging exterior 302 that converges toward the top of the fulfillment center. The converging exterior 302 enables placement of landing and deployment surfaces about the converging exterior 302 that have relatively open and clear airspace above each surface. The clear airspace may limit or minimize possible interference between UAVs, including interference from downwash or other movement of air caused by nearby UAVs. The ML fulfillment center 300 may include some or all of the features shown and described with reference to the ML fulfillment center 100, while having a different exterior profile.

The ML fulfillment center 300 includes a first UAV platform 304 located adjacent to a second UAV platform 306, which is located on a higher level than the first UAV platform 304. However, because of the converging profile of the ML fulfillment center 300, the second UAV platform 306 is not located directly above of the first UAV platform 304, but is instead offset and closer to a center longitudinal axis 308 of the ML fulfillment center 300 than the first UAV platform 304.

As shown in FIG. 3, the ML fulfillment center 300 may include the converging exterior 302 that resembles a profile of a beehive. However, the converging exterior 302 may be shaped like a cone, a pyramid, or otherwise shaped to have a converging or at least partially converging exterior that converges over at least a portion of the exterior surface (e.g., converges near a top portion of the ML fulfillment center 300). As another example, some sides may have a converging profile while other sides may not have a converging profile, which may accommodate additional interior volume of the ML fulfillment center 300.

Figure 4:
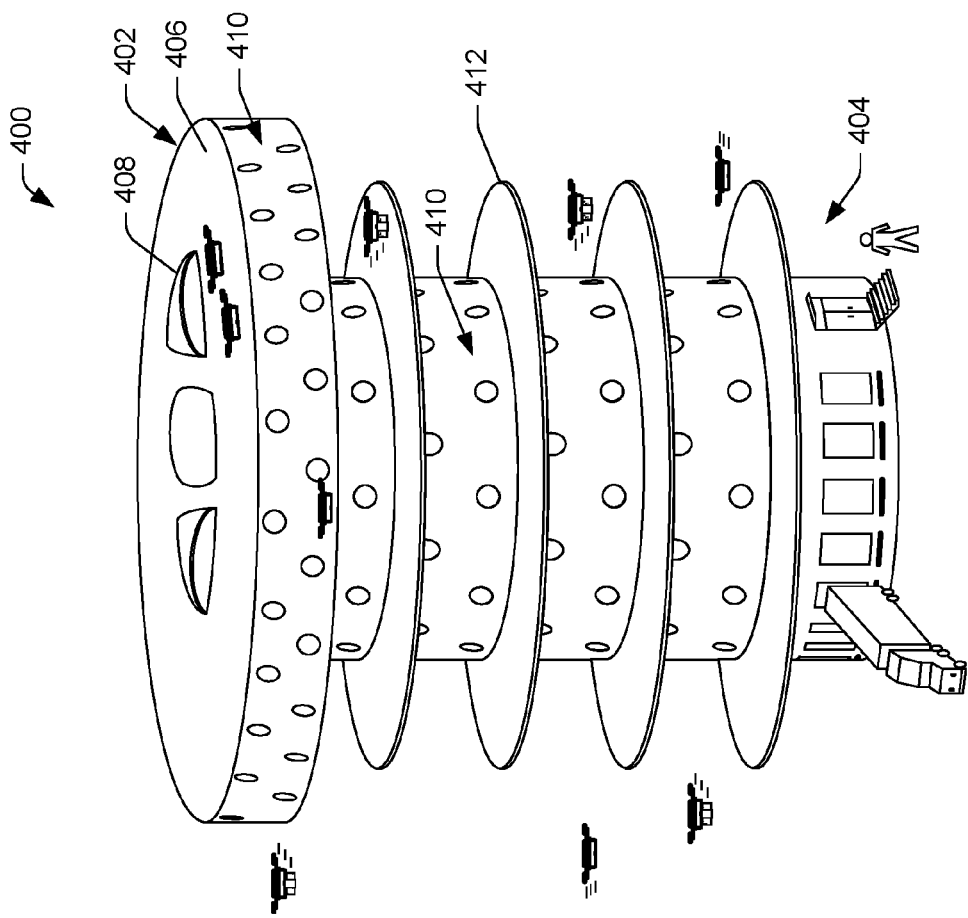
FIG. 4 is an isometric view of an illustrative multi-level fulfillment center having a top section that extends outward beyond a base section of the fulfillment center. The top section provides additional surface area for landing and deploying UAVs from a high elevation of the fulfillment center.

FIG. 4 is an isometric view of an illustrative multi-level fulfillment center 400 having a top section 402 that extends outward beyond a base section 404 of the ML fulfillment center 400. The ML fulfillment center 400 may include some or all of the features shown and described with reference to the ML fulfillment center 100, while having a different exterior profile.

The top section 402 may provide a large surface area 406 for landing and deploying UAVs from a high elevation of the fulfillment center, among other possible uses. As discussed above, it may be advantageous to deploy UAVs as close to a cruising altitude as possible to reduce drain of power sources used by UAVs to climb to the cruising altitude. Similarly, it may be advantageous to land some UAVs at a higher elevation, such as larger UAVs and/or noisier UAVs. The top section 402 may include a service location 408, which may be easily accessible by UAVs that may approach the ML fulfillment center 400 with limited remaining power, limited flight controls, and/or other limitations. The top section 402 may include apertures 410 to enable UAVs to gain access to an interior of the ML fulfillment center 400 as discussed above. The apertures 410 may be circular, rectangular, oval, polygon-shaped, or shaped in other ways to accommodate entry and exit of UAVs.

The top section 402 may include any number of levels, which may include internal UAV service sites (or external landing UAV platforms that include UAV service sites, as discussed above). The top surface may consume available airspace above adjacent buildings, which may be available for acquisition under some local zoning ordinances. In an exemplary operation, a UAV may fly into and through an open aperture to a UAV service site located within the ML fulfillment center 400. The aperture may open just prior to entry by the UAV and may close just after the entry of the UAV. The apertures 410 may remain in a closed position as a default to provide security and to protect an interior of the ML fulfillment center 400 from environmental conditions such as precipitation and wind. The UAV may be assigned to an aperture and arrival of a specific assigned AUV may trigger the opening and closing of the aperture, such as using an exchange or one-way wireless communication and/or other secure communications exchanged between the UAV and a controller of the aperture.

In some embodiments, the ML fulfillment center 400 may include one or more intermediate extended surfaces 412 that span outward from the ML fulfillment center 400 between different ones of the apertures 410. The intermediate extended surfaces 412 may create separate zones between the apertures 410. Like the large surface area 406, the intermediate extended surfaces 412 may provide landing and deployment space for the UAVs, as well as provide other advantages such as to block travel of noise, downwash from UAVs, weather (e.g., wind, precipitation, etc.) and/or physically separate airspace between UAV that may otherwise be flying near one another. The intermediate extended surfaces 412 may be used with any of the ML fulfillment center designs discussed herein since these features, and most other features described herein are interchangeable with other fulfillment center designs. Thus, a variation of the hub and spoke ML fulfillment center 200 may include the intermediate extended surfaces 412, for example, but may or may not include the top section 402, in some embodiments.

Figure 5:
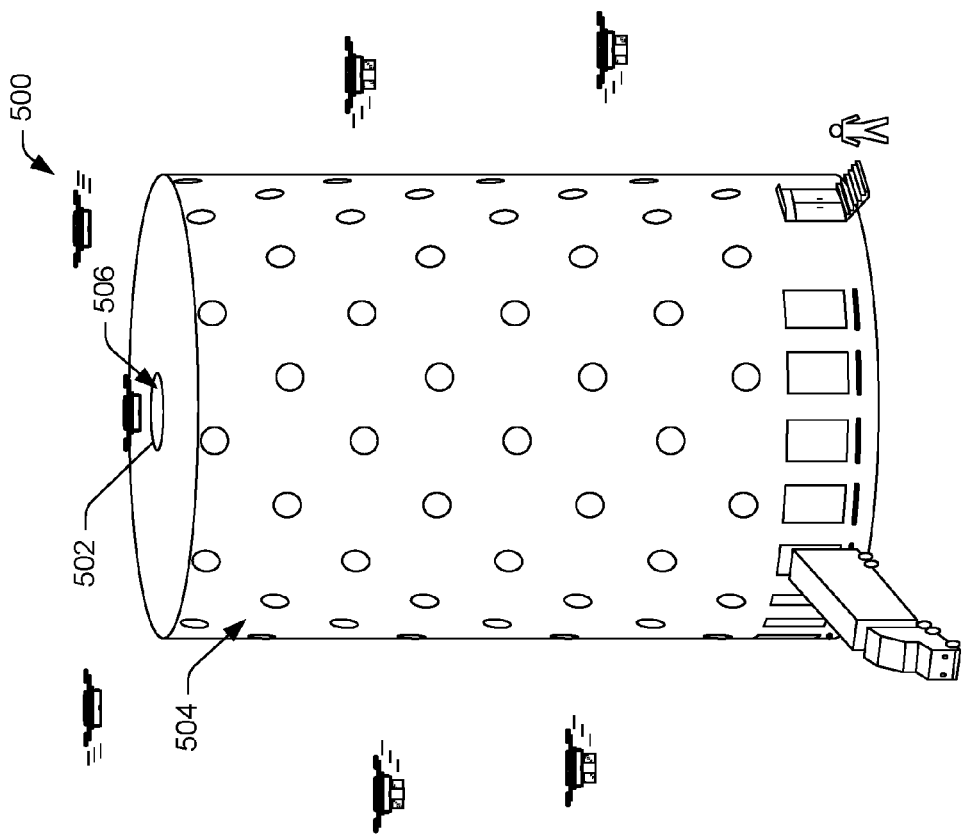
FIG. 5 is an isometric view of an illustrative multi-level fulfillment center having a vertical corridor to accommodate entrance and exit of unmanned aerial vehicles (UAVs).

FIG. 5 is an isometric view of an illustrative multi-level fulfillment center 500 having a vertical corridor to accommodate entrance and exit of unmanned aerial vehicles (UAVs). The ML fulfillment center 500 may include some or all of the features shown and described with reference to the ML fulfillment center 100, while having a different exterior profile.

The ML fulfillment center 500 may include a main aperture 502 and exterior apertures 504. In some embodiments, using a first process, the UAVs may be routed into the main aperture 502 to gain entry into the ML fulfillment center 500. The UAVs may fly through the main aperture, and into an internal corridor 506 that may extend deep within the ML fulfillment center 500. The UAV may fly to an assigned level within the ML fulfillment center 500. The UAVs, once inside the ML fulfillment center 500, may land at internal UAV service sites inside the ML fulfillment center 500. While inside the ML fulfillment center 500, the UAVs may be serviced, inspected, and/or coupled to packages to be delivered to a destination. The UAVs may be moved to deployment site (e.g., another UAV service site) proximate to one of the external apertures 504 and readied for flight. Just prior to flight, a controller (e.g., device or person) may cause a respective exterior aperture to open to enable a respective UAV located proximate to the aperture to exit the ML fulfillment center 500. The aperture may then close after the UAV is clear from the aperture. In these embodiments, the flight plans of the UAVs may cause some or all of the UAVs to enter the ML fulfillment center 500 from above at the main aperture 502, and then exit laterally at the various exterior apertures 504, which may minimize potential flight path conflicts of the various UAVs, even when large volumes of UAVs are entering and exiting the ML fulfillment center 500 during a relatively short period of time. In these embodiments, an impact dampener, such as foam, a net, or other impact dampeners may be located at or near the bottom of the internal corridor 506, which may absorb impact forces of a UAV, such as when a UAV falls toward the impact dampener due to lack of power or mechanical failure.

In various embodiments, using a second process, the UAVs may be routed into the exterior apertures 504 to gain entry into the ML fulfillment center 500. The UAVs, once inside the ML fulfillment center 500, may land at internal landing sites inside the ML fulfillment center 500. While inside the ML fulfillment center 500, the UAVs may be serviced, inspected, and/or coupled to packages to be delivered to a destination. The UAVs may be moved to deployment site proximate to the main aperture 502 and readied for flight. The UAV may then exit the ML fulfillment center 500 using the main aperture 502. In these embodiments, the flight plans of the UAVs may cause some or all of the UAVs to enter the ML fulfillment center 500 laterally from the various exterior apertures 504 and then exit the ML fulfillment center 500 from above via the main aperture 502, which may minimize potential flight path conflicts of the various UAVs, even when large volumes of UAVs are entering and exiting the ML fulfillment center 500 during a relatively short period of time. In these embodiments, a lift assist mechanism or launch assist mechanism may be located at or near the bottom of the internal corridor 506, which may provide additional lift for exiting UAVs to lessen drain of power sources of the UAVs while climbing to the cruising altitude.

In some embodiments, the main aperture 502 may include a door that opens or closes. In various embodiments, the main aperture 502 may be open for extended periods of time to allow UAVS to move through the main aperture. The ML fulfillment center 500 may include internal securing doors within the internal corridor 506, which may selectively secure the ML fulfillment center 500 from access by unauthorized UAVs that enter via the main aperture 502. In some embodiments, the internal corridor 506 may include multiple entry points to internal locations of the ML fulfillment center 500 at various different levels within the ML fulfillment center 500, possibly to every level of the ML fulfillment center 500 or to all levels designated for access by UAVs. Some levels may be restricted from access by UAVs such levels used for customer pick-ups and levels used for receipt of freight.

Figure 6B:
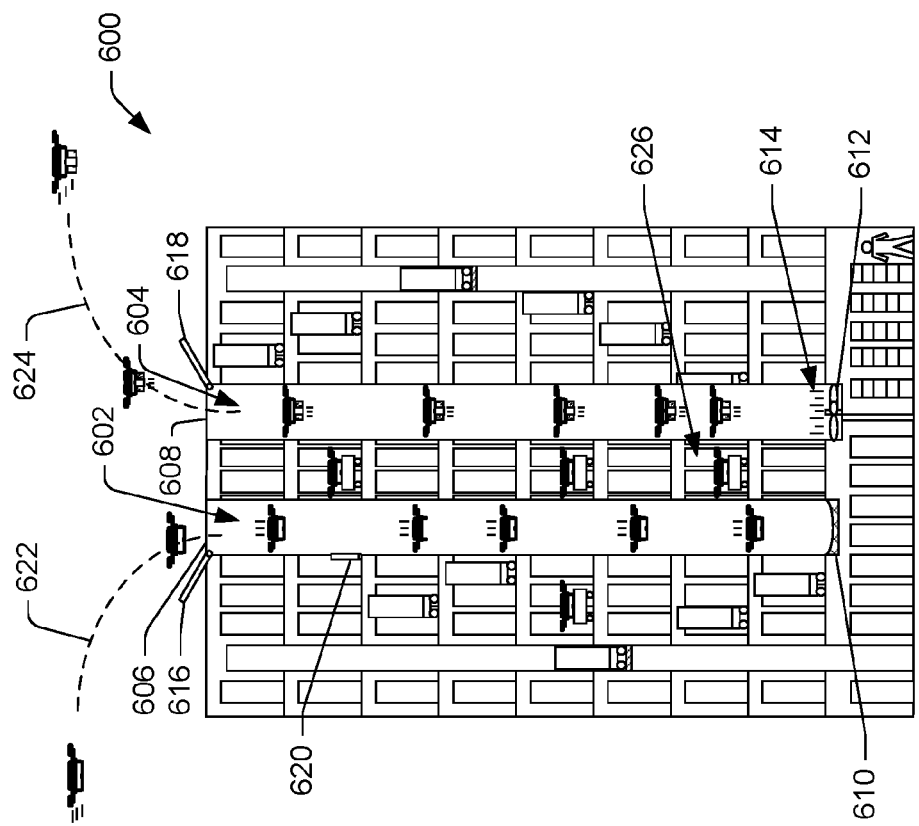
FIG. 6B is a side elevation view of a cross-section of the multi-level fulfillment center shown in FIG. 6A.
Figure 6A:
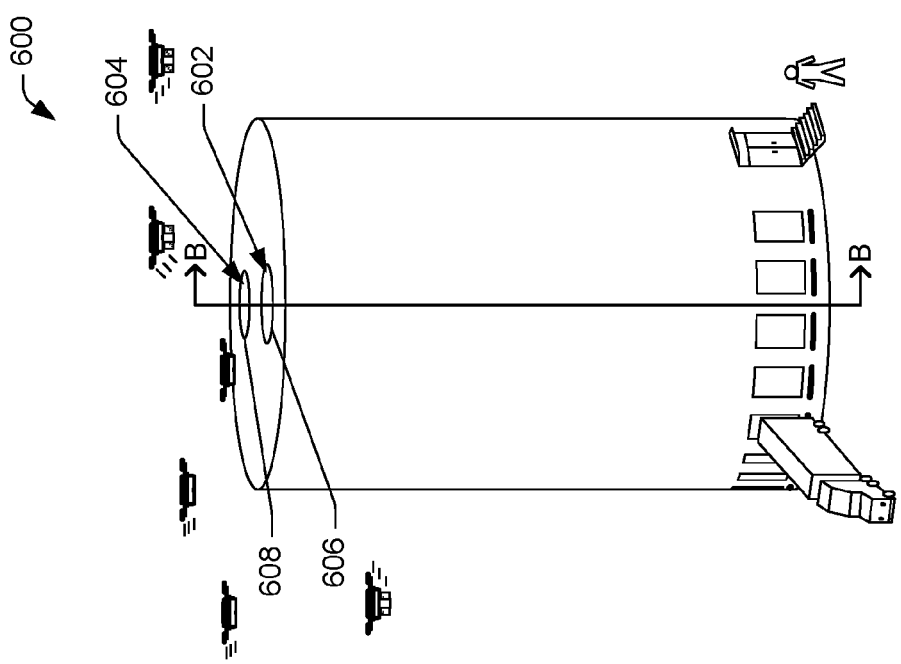
FIG. 6A is an isometric view of an illustrative multi-level fulfillment center having multiple vertical corridors to accommodate entrance and exit of UAVs.

FIG. 6A is an isometric view of an illustrative multi-level fulfillment center 600 having multiple vertical corridors to accommodate entrance and exit of unmanned aerial vehicles (UAVs). The ML fulfillment center 600 may include some or all of the features shown and described with reference to the ML fulfillment center 100, while having a different exterior profile.

The ML fulfillment center 600 may include a first aperture 602 and a second aperture 604. In some embodiments, the UAVs may be routed into the first aperture 602 to gain entry into the ML fulfillment center 600. The UAVs may fly through the first aperture 602, and into a first internal corridor 606 that may extend deep within the ML fulfillment center 600. The UAV may fly to an assigned level within the ML fulfillment center 600. The UAVs, once inside the ML fulfillment center 600, may land at internal landing sites inside the ML fulfillment center 600. While inside the ML fulfillment center 600, the UAVs may be serviced, inspected, and/or coupled to packages to be delivered to a destination. The UAVs may be moved, through passages, to deployment sites proximate to a second internal corridor 608 and readied for flight. The UAVs may be deployed, in stages, to exit the second aperture 604 of the ML fulfillment center 600 via the second internal corridor 608.

FIG. 6B is a side elevation view of a cross-section of the multi-level fulfillment center 600 shown in FIG. 6A. In various embodiments, an impact dampener 610, such as a net, foam, and/or other impact dampeners may be located at or near the bottom of the first internal corridor 606, which may absorb impact forces of a UAV, such as when a UAV falls toward the impact dampener due to lack of power or mechanical failure. A lift assist mechanism 612 (or launch assist mechanism) may be located at or near the bottom of the second internal corridor 608, which may provide additional lift for exiting UAVs to lessen drain of power sources of the UAVs while climbing to the cruising altitude. The lift assist mechanism 612 may create an upward airflow 614 to enable UAVs to exit the second internal corridor 608 using less power than would otherwise be used without operation of the lift assist mechanism 612. The lift assist mechanism 612, in some embodiments, may propel or launch UAVs toward the second aperture 604.

In some embodiments, the first aperture 602 may be selectively secured by a first door 616 that opens and closes and the second aperture 602 may be selectively secured by a second door 618 that opens and closes. In various embodiments, the first door 616 and/or the second door 618 may be open for extended periods of time to allow UAVS to move through the respective apertures. The ML fulfillment center 600 may include internal securing doors 620 within the first internal corridor 606 and/or the first internal corridor 608, which may selectively secure the ML fulfillment center 600 from access by unauthorized UAVs that enter the ML fulfillment center 600. In some embodiments, the internal securing doors 620 may be used in lieu of the first door 616 and/or the second door 618. In some embodiments, the first internal corridor 606 may include multiple entry points to internal locations of the ML fulfillment center 600 at various different levels within the ML fulfillment center 600, possibly to every level of the ML fulfillment center 600 or to all levels designated for access by UAVs. Some levels may be restricted from access by UAVs such levels used for customer pick-ups and levels used for receipt of freight. After landing from entry from the first internal corridor 606, UAVs may be transported, via passages 626, to a location proximate to the second internal corridor 608, which may or may not be on a same level as the landing site for a particular UAV. In some embodiments, UAVs may be moved internally by mechanisms, such as robots, elevators, conveyers, and/or other lifting mechanisms to gain a higher location prior to deployment for at least the purpose of reducing power consumption by the UAV to climb to the cruising altitude.

UAVs entering the first aperture 606 may generally adhere to an approach flight path 622 while UAVs exiting the second aperture 608 may generally adhere to a departure flight path 624 for at least a portion of a flight. The UAVs, once exited from the second aperture 608 and a predetermined distance from the ML fulfillment center 600 and/or from other UAVs, may then deviate from the departure flight path 624 and initiate a specific flight plan for the UAV to direct the UAV to a destination for that UAV.

Figure 7:
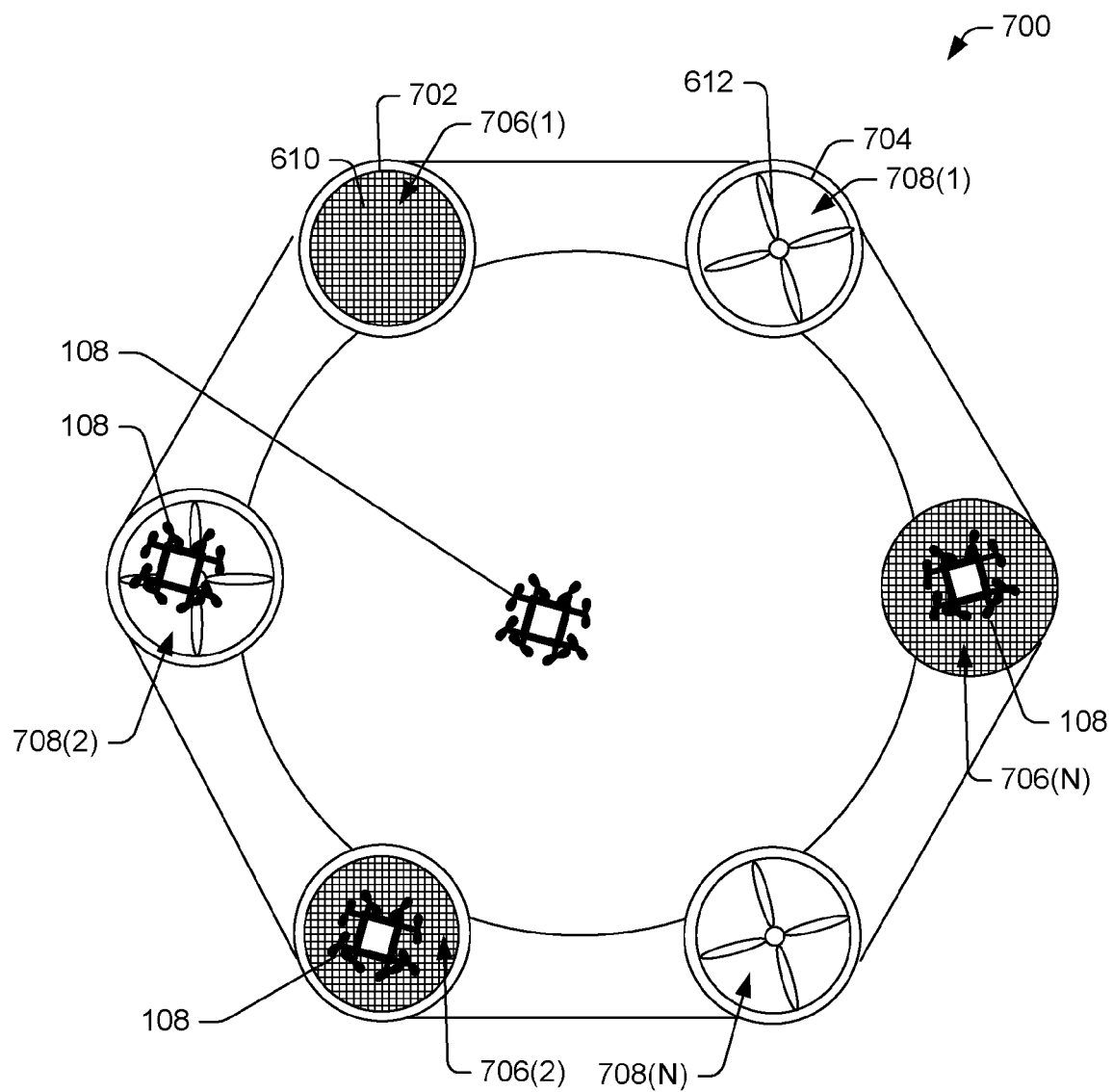
FIG. 7 is a top plan view of an illustrative multi-level fulfillment center having multiple corridors, where some corridors are configured for deployment of UAVs while other corridors are configured to receive incoming UAVs.

FIG. 7 is a top plan view of an illustrative multi-level fulfillment center 700 having multiple corridors, where some corridors are configured for deployment of UAVs while other corridors are configured to receive incoming UAVs.

The ML fulfillment center 700 may include multiple apertures, including a first aperture 702 and a second aperture 704. In some embodiments, the UAVs 108 may be routed into the first aperture 702 to gain entry into the ML fulfillment center 700. The UAVs may fly through the first aperture 702, and into a first internal corridor 706(1) that may extend deep within the ML fulfillment center 700. The UAV may fly to an assigned level within the ML fulfillment center 700. The UAVs, once inside the ML fulfillment center 700, may land at internal landing sites inside the ML fulfillment center 700. While inside the ML fulfillment center 700, the UAVs may be serviced, inspected, and/or coupled to packages to be delivered to a destination. The UAVs may be moved to deployment site proximate to a second internal corridor 708(1) and readied for flight. The UAVs may be deployed, in stages, to exit the second aperture 704 of the ML fulfillment center 700 via the second internal corridor 708(2). The first internal corridor 706(1) and the second internal corridor 708(1) may be used together with UAVs that access a particular portion of the ML fulfillment center 700 via passages. However, in some embodiments, UAVs entering the first internal corridor 706(1) may exit another second internal corridor, such as any of second internal corridors 708(2) . . . 708(N). Similarly, UAVs may enter any of first internal corridors 706(2) . . . 706(N). The arrangement shown in FIG. 7 may be applied to a fulfillment center having an internal shape similar to that shown in FIG. 2, which resembles a hub and spoke profile and possibly to other fulfillment center designs having different exterior shapes. The corridors may not all have a same depth and/or access to same levels within the ML fulfillment center 700. By having different depths, the ML fulfillment center 700 may have more internal volume to store items and/or more volume useable for other operations.

As discussed above, the impact dampener 610, such as a net, foam, and/or other impact dampeners may be located at or near the bottom of the first internal corridors 706(1)-(N), which may absorb impact forces of a UAV, such as when a UAV falls toward the impact dampener due to lack of power or mechanical failure. The lift assist mechanism 612 (or launch assist mechanism) may be located at or near the bottom of the second internal corridors 708(1)-(N), which may provide additional lift for exiting UAVs to lessen drain of power sources of the UAVs while climbing to the cruising altitude. The lift assist mechanism 612, in some embodiments, may propel or launch UAVs toward the second apertures. Each aperture may have an associated door to secure the aperture and/or doors may be used within each corridor as discussed above to secure entry and/or exit points for levels within the ML fulfillment center 700.

Figure 8A:
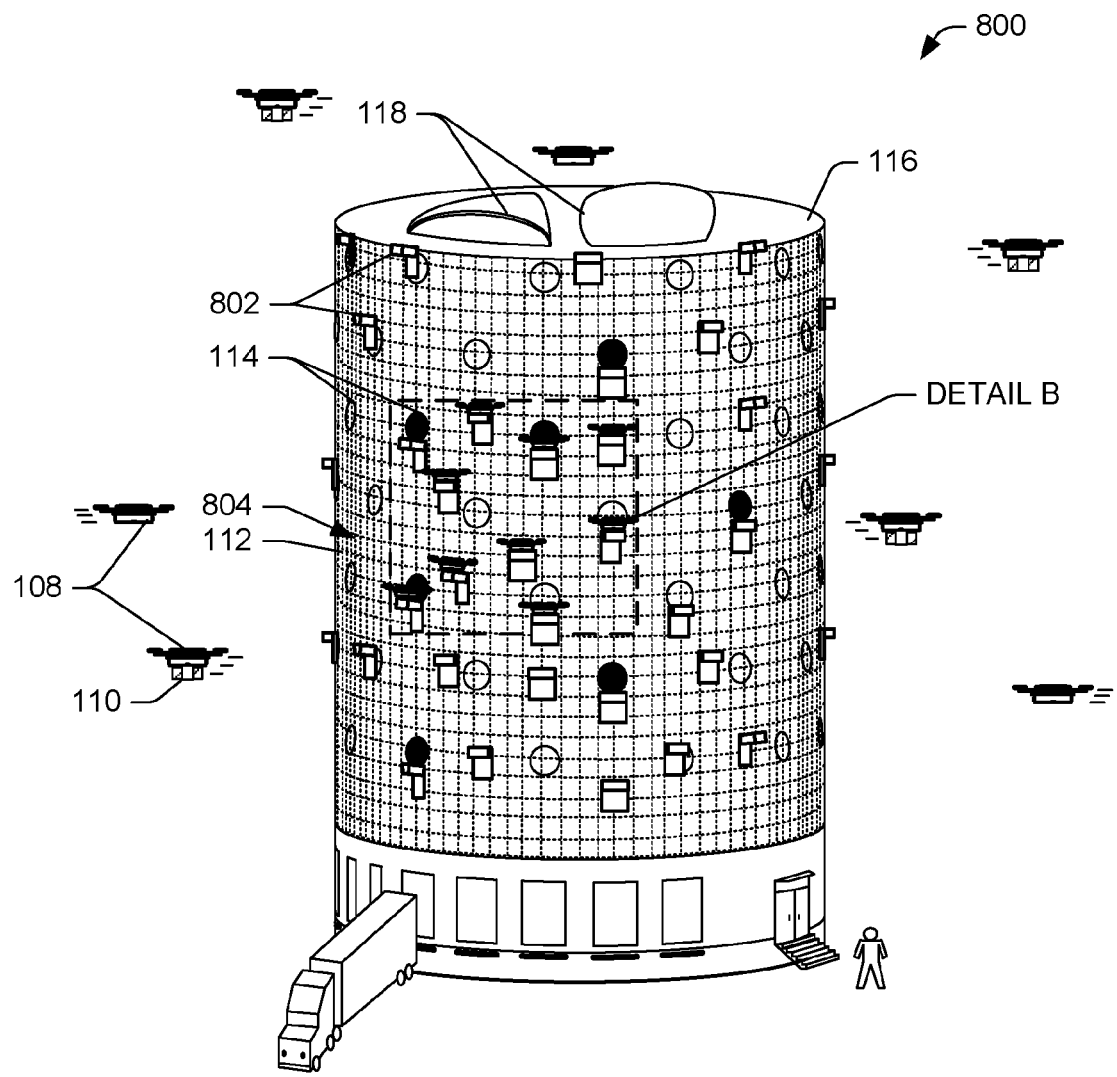
FIG. 8A is an isometric view of an illustrative multi-level fulfillment center designed to accommodate movement of UAVs pods about an exterior of the fulfillment center. The UAV pods are configured for landing and takeoff of UAVs and movement about the exterior of the fulfillment center.

FIG. 8A is an isometric view of an illustrative multi-level fulfillment center 800 designed to accommodate movement of UAVs pods about an exterior of the fulfillment center. The UAV pods are configured for landing and takeoff of UAVs and movement about the exterior of the fulfillment center. The ML fulfillment center 800 may include some or all of the features shown and described with reference to the ML fulfillment center 100, while having a different exterior profile.

The ML fulfillment center 800 may include moveable UAV platforms 802 configured to receive and deploy UAVs 108, which may carry packages 110 from the ML fulfillment center to destinations associated with customers. The moveable UAV platforms 802 may be located on an exterior of the fulfillment center and may be configured to move about the exterior shell 112 of the ML fulfillment center 800 by traversing a grid 804. The grid 804 may be a static grid having coupling features at least partially extending outward from the ML fulfillment center 800, which enable the movable UAV platforms 802 to grasp or otherwise couple to, and thus secure the moveable UAV platforms 802 to the ML fulfillment center 800. In some embodiments, the grid 804 may include a power network which may be used to provide power to the moveable UAV platforms 802 in a similar way that some electric trains obtain power from a connection to a rail. However, unlike trains, the moveable UAV platforms 802 may be capable of moving in more than two directions, such as by moving up, down, or laterally right/left along the grid 804, as further explained below.

The exterior shell 112 may include the apertures 114, which may enable the UAVs to gain entrance to and/or exit from the ML fulfillment center 800 and/or may enable loading UAVs that are external to the ML fulfillment center 800 with packages and/or other equipment (e.g., charged batteries and/or other supplies). The apertures 114 may be spaced apart from one another to enable takeoff and landing of UAV from a location proximate to the aperture without conflict with other UAVs. The apertures 114 may be secured by doors and/or other physical mechanisms to prevent unauthorized access, such as physical access, line of sight access (visual access), or both.

Figure 8B:
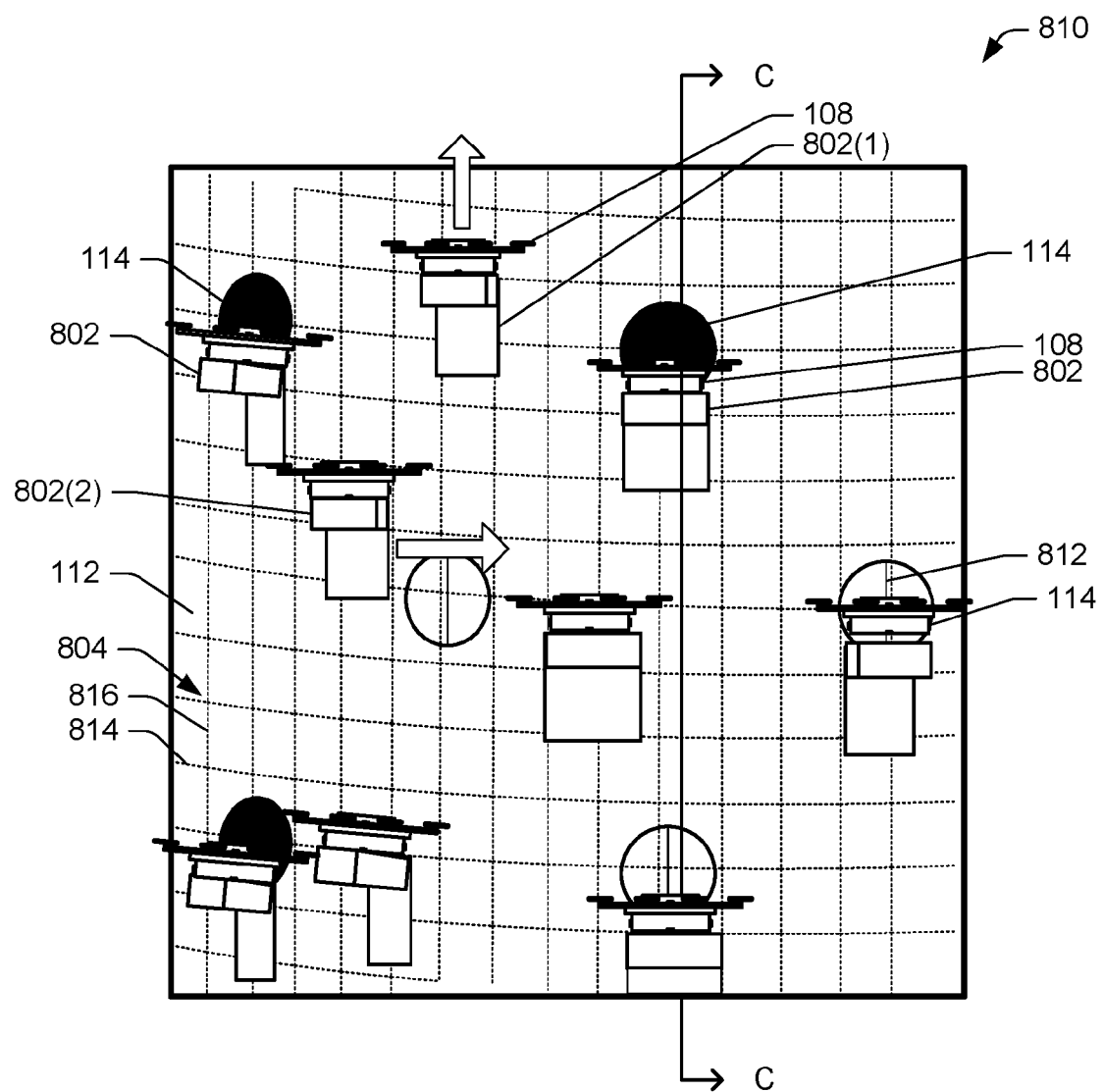
FIG. 8B is a detail view of an exterior of the fulfillment center shown in FIG. 8A showing illustrative movement options for various moveable UAV platforms.

FIG. 8B is a detail view of portion 810 of the exterior of the ML fulfillment center 800 shown in FIG. 8A showing illustrative movement options for various moveable UAV platforms. During operation, a UAV 108 may land on a moveable UAV platform 802, which may or may not be proximate to one of the apertures 114. The moveable UAV platform 804 may move the UAV to align with an aperture of the various apertures 114, such as an aperture assigned to the particular UAV. The aperture 114 may be opened via opening a door 812 to enable servicing, coupling a package, and/or other tasks. The UAV 108 may then be prepared for deployment. In some embodiments, a moveable UAV platform 802(1) may move a UAV to a higher location on the exterior shell 112 of the ML fulfillment center 800 before takeoff of the UAV, which may save power resources of the UAV from being used to climb this distance during flight. In some embodiments, a moveable UAV platform 802(2) may traverse over closed apertures, which may include the doors 810 having the grid 804 or doors that are configured to enable the moveable UAV platform to travel across the doors without hindering movement of the moveable UAV platform, which may span across the door and/or couple to the door.

In some embodiment, the grid 804 may include horizontal rows 814 and vertical columns 816 of the coupling features, which may enable the moveable UAV platforms 802 to move about as discussed below. However, other configurations of the grid may be used, which may use any type of symmetric or non-symmetric arrangement of features on the exterior of the ML fulfillment center 800.

In some embodiments, there may be more moveable UAV platforms 802 than apertures 114 to access the UAVs. The additional moveable UAV platforms 802 may accommodate UAVs that are waiting for access to an aperture, on standby, or otherwise unused. For example, UAVs may be charged or otherwise replenished with a power supply while located on a moveable UAV platform 802.

FIG. 8C is a side elevation view of a cross section from FIG. 8B of a moveable UAV platform 820 coupled to the exterior of the ML fulfillment center 800. The moveable UAV platform 820 may include a pod 822 to receive the UAV 108. The pod 822 may be coupled to a traversal base 824 that includes a movement mechanism 826 configured to couple to and traverse the grid 804. In some embodiments, the movement mechanism 826 may include arms that selectively couple to the coupling features of the grid 804. The arms may include rollers or pivoting features that enable movement of the pod 822 relative to the grid 804.

The pod 822 may include features to secure to a UAV that lands on the pod, such as to keep the UAV secure and stationary during winds or other possible unintended movement of the UAV. The pod 822 may be powered and may provide power to the UAV, such as to charge a power source of the UAV (e.g., a battery) and/or to perform other services and/or functions as described herein. In some embodiments, the pod 822 may detach, at least temporarily, from the traversal base 824, which may enable the pod 822 to move inside of the ML fulfillment center 800. The pod 822 may include wheels or other movement mechanisms to enable the pod 824 to move about the ML fulfillment center 800, such as described above with regard to the robots 124. In various embodiments, the pod 822 may stay coupled to the traversal base 824, but may extend through the aperture 114 to enable the UAV to be serviced and/or loaded with a package while inside or partially inside the ML fulfillment center 800. The door 812 may open to allow access to the ML fulfillment center 800 and may later close to prevent the access.

The traversal base 824 may include the movement mechanism 826, such as arms, that may engage coupling features of the grid 804. The grid 804 may include at least first components 828 and second components 830, some of which the movement mechanism 826 may couple to, thus enabling the traversal base to secure to the ML fulfillment center 800. In some embodiments, the grid 804 may provide power to the moveable UAV platform 820 via the first components 828 and/or the second components 830. For example, the first components 828 may be "live" or "hot" while the second components 830 may be neutral, or vice versa. The movement mechanism 826 may receive power through connection with at least some of the first components 828 and/or the second components 830. The power may then be used to support movement of the moveable UAV platform 820 about the exterior shell 112 of the ML fulfillment center 800. In various embodiments, the moveable UAV platform 820 may include a battery 832. The battery may be charged via charging locations via the grid, which may be limited locations about the exterior of the ML fulfillment center 800, such as locations adjacent to the apertures 114 where the platforms may spend a majority of their time.

The moveable UAV platform 820 may include a controller to control operation and movement of the moveable UAV platform 820. The controller may navigate the moveable UAV platform 820 using a set of instructions from a central control and/or using at least some autonomous operation to avoid conflict with other moveable UAV platforms. The controller 834 may use similar logic as an autonomous household vacuum cleaner to navigate the exterior of the ML fulfillment center 800, for example.

FIGS. 8D and 8F show deployment of a UAV using a tilt mechanism 836 of the moveable UAV platform 820. As shown in FIG. 8D, the pod 822 may include a pod portion 836 that may tilt or otherwise move in response to activation of a tilt mechanism 838 to cause the UAV 108 to be directed to a particular launch direction. The tilt mechanism 838 may be a mechanical mechanism, pneumatic mechanism, and/or other type of mechanism that causes movement of the pod portion 836 relative to the traversal base 824 to cause the UAV 108 to launch in a direction away from the exterior shell 112 of the ML fulfillment center 800.

FIG. 8E shows the UAV 108 launching away from the pod portion 836. In some embodiments, a launch assist mechanism 840 may assist the launch of the UAV 108, such as by providing a force to move the UAV in an outward direction from the pod portion 836. The launch assist mechanism 840 may be mechanical mechanism, pneumatic mechanism, and/or other type of mechanism that causes movement of the UAV 108 relative to the pod portion 836 to cause the UAV 108 to launch in a direction away from the exterior shell 112 of the ML fulfillment center 800.

Figure 9:
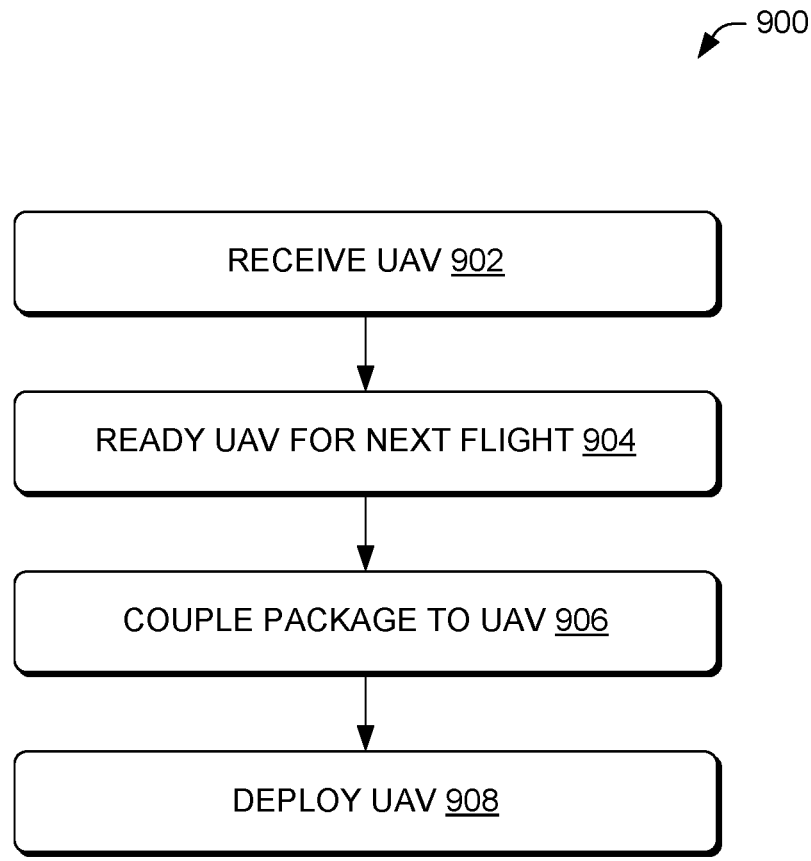
FIG. 9 is a flow diagram of illustrative operation of a fulfillment center that uses UAVs to perform at least some deliveries of items from the fulfillment center.
Figure 10:
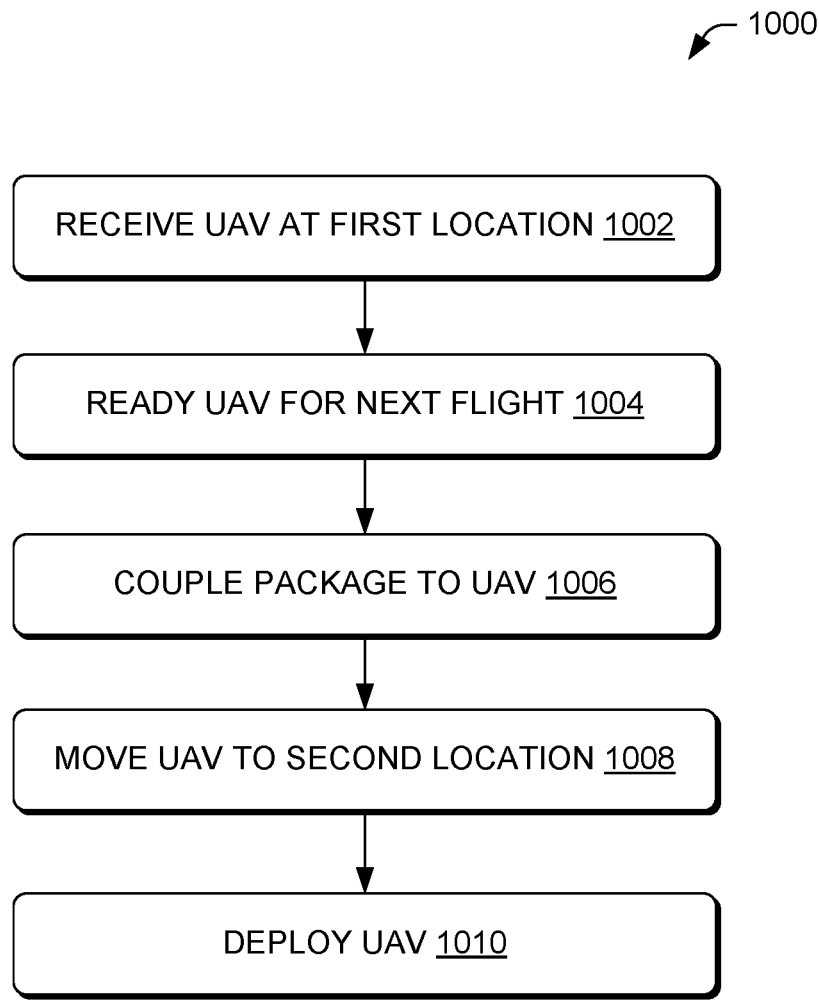
FIG. 10 is a flow diagram of additional illustrative operation of a fulfillment center that uses UAVs to perform at least some deliveries of items from the fulfillment center.

FIGS. 9 and 10 are flow diagrams illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the process.

FIG. 9 is a flow diagram of illustrative operation 900 of a fulfillment center that uses UAVs to perform at least some deliveries of items from the fulfillment center. The process 900 is described with reference to the preceding FIGS. 1A-8E. Of course, the process 900 may be performed in other similar and/or different environments.

At 902, the UAV may be received at a ML fulfillment center. For example, the UAV may fly to a designated landing site of the ML fulfillment center, which may be located on one of multiple levels of the ML fulfillment center. The landing site may be external to the ML fulfillment center or may be within the ML fulfillment center.

At 904, the UAV may be readied for a next flight. For example, the UAV may be serviced, inspected, powered, undergo a battery replacement, coupled to a package for delivery, and/or otherwise interacted with prior to the next flight. In some embodiments, at least some of the operation 904 may be performed by one or more of the robots 124 in the ML fulfillment center. Human workers may perform some of the operations 904, such as maintenance operations, inspection operations, and/or picking of items for the package 110, among other possible tasks.

At 906, the package 110 may be coupled to the UAV 108. The coupling may be performed by a robot, by the UAV 108, and/or by a human worker. The package may be coupled to the UAV while the UAV is inside of the ML fulfillment center or while the UAV is outside of the ML fulfillment center and on a launch platform, for example.

At 908, the UAV may be deployed with the package for the destination associated with the package. In some embodiments, the UAV may be launched with a launch mechanism and/or with assistance by a launch assist mechanism, which may at least partially reduce an amount of energy used by the UAV to reach a cruising altitude. In some embodiments, the coupling of the package may be used to impart a launch force on the UAV. The UAV may launched at any angle outward from the ML fulfillment center, including in a direction perpendicular to the exterior shell 112 of the ML fulfillment center.

FIG. 10 is a flow diagram of additional illustrative operation 1000 of a fulfillment center that uses UAVs to perform at least some deliveries of items from the fulfillment center. The process 1000 is described with reference to the preceding FIGS. 1A-8E. Of course, the process 1000 may be performed in other similar and/or different environments.

At 1002, the UAV may be received at a ML fulfillment center at a first location. For example, the UAV may fly to a landing site of the ML fulfillment center, which may be located on one of multiple levels of the ML fulfillment center. The landing site may be external to the ML fulfillment center or may be within the ML fulfillment center.

At 1004, the UAV may be readied for a next flight. For example, the UAV may be serviced, inspected, powered, undergo a battery replacement, coupled to a package for delivery, and/or otherwise interacted with prior to the next flight. In some embodiments, at least some of the operation 1004 may be performed by one or more of the robots 124 in the ML fulfillment center. Human workers may perform some of the operations 1004, such as maintenance operations, inspection operations, and/or picking of items for the package 110, among other possible tasks.

At 1006, the package 110 may be coupled to the UAV 108. The coupling may be performed by a robot, by the UAV 108, and/or by a human worker. The package may be coupled to the UAV while the UAV is inside of the ML fulfillment center or while the UAV is outside of the ML fulfillment center and on a launch platform, for example.

At 1008, the UAV may be moved to a second location. For example, the UAV may be moved to a launch site of the ML fulfillment center, which may be located on one of multiple levels of the ML fulfillment center. The launch site may be external to the ML fulfillment center or may be within the ML fulfillment center. In some embodiments, the launch site may be on a different level of the ML fulfillment center than the landing site. In various embodiments, the UAV may be moved to a launch site that is higher that the landing site, thereby at least partially reducing an amount of energy used by the UAV to reach a cruising altitude. The UAV may be moved to the launch site by flight of the UAV, by one of the robots 124, by a human worker, and/or by other mechanisms (e.g., a conveyer, an elevator, a launch mechanism, a pneumatic tube, etc.).

At 1010, the UAV may be deployed with the package for the destination associated with the package. In some embodiments, the UAV may be launched with a launch mechanism and/or with assistance by a launch assist mechanism, which may at least partially reduce an amount of energy used by the UAV to reach a cruising altitude.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A multi-level fulfillment center configured to support distribution of items by unmanned aerial vehicles (UAVs), the multi-level fulfillment center comprising:
   an exterior shell to secure internal operations of the multi-level fulfillment center;
   UAV platforms to support landings and takeoffs of the UAVs, the UAV platforms coupled to the exterior shell;
   apertures located in the exterior shell at different altitudes to provide at least access to the UAVs located on the UAV platforms, wherein a first aperture provides access to an authenticated UAV on a first UAV platform located proximate to the first aperture, the authenticated UAV to be readied for a next flight while on the first UAV platform to deliver an item from the multi-level fulfillment center to a destination associated with a customer;
   aperture doors to selectively close the apertures, wherein a first door is configured to secure the first aperture in a closed position at least when the first UAV platform is not occupied by the authenticated UAV;
   a controller to authenticate the UAVs and control the aperture doors, wherein the controller causes a second door to open based at least in part on a determination that an incoming UAV being received at a second UAV platform is authorized to access the multi-level fulfillment center;
   a receiving area within the exterior shell to receive freight that includes the item and other items available for consumption by customers; and
   a storage area within the exterior shell to organize and store the item and the other items prior to distribution to customers by the UAVs.

2. The multi-level fulfillment center as recited in claim 1, wherein the apertures are arranged about the exterior shell to provide at least a predetermined vertical spacing between vertically adjacent apertures and a horizontal spacing between horizontally adjacent apertures, the predetermined vertical spacing and the horizontal spacing enabling concurrent use of adjacent apertures by different ones of the UAVs.

3. The multi-level fulfillment center as recited in claim 1, further comprising:
   an internal corridor accessible by at least one of the apertures, the internal corridor providing access by the UAVs to the different altitudes within the multi-level fulfillment center; and
   at least one of a lift assist mechanism or an impact dampener located proximate to a bottom of the internal corridor, the lift assist mechanism to provide upward air movement through the internal corridor, the impact dampener to reduce potential damage to a UAV that falls into the impact dampener.

4. The multi-level fulfillment center as recited in claim 1, wherein the first UAV platform includes arms that selectively engage coupling features coupled to the exterior shell and move the first UAV platform relative to the coupling features; and further comprising a grid of the coupling features extending outward from the exterior shell, the coupling features to provide power to the first UAV platform as the first UAV platform moves about the coupling features.

5. The multi-level fulfillment center as recited in claim 1, further comprising an internal transport robot to move a UAV from the first UAV platform to a second UAV platform used for takeoff of the UAV and to charge a power source of the UAV.

6. A multi-level structure comprising:
an exterior shell to secure an interior of the multi-level structure;
a receiving area within the exterior shell to receive freight that includes items available for consumption by customers;
a storage area within the exterior shell to organize and store the items prior to distribution to customers by unmanned aerial vehicles (UAVs);
a plurality of apertures in the exterior shell to enable access by the UAVs to different levels within the interior of the multi-level structure;
a controller to authenticate UAVs based at least in part on a determination that the UAVs are authorized to access the multi-level structure; and
UAV service sites located proximate to the plurality of apertures, the UAV service sites configured for at least landing and takeoff of the UAVs.

7. The multi-level structure as recited in claim 6, further comprising aperture doors to selectively close the plurality of apertures at least during time periods that have an absence of authenticated UAVs.

8. The multi-level structure as recited in claim 7, further comprising the controller to further control operation of the aperture doors.

9. The multi-level structure as recited in claim 6, wherein the exterior shell includes a converging profile that converges toward a point at a top of the exterior shell, the converging profile to provide unobstructed airspace above at least some of the UAV service sites to enable the UAVs to land and deploy vertically.

10. The multi-level structure as recited in claim 6, wherein the exterior shell includes levels having a hub and spoke design including multiple spokes that span out from the hub, each of the spokes and the hub having interior space configured to support fulfillment operations, and wherein the spokes internally include the UAV service sites, wherein a first UAV service site is adjacent to a first aperture and a second aperture enabling at least servicing a first UAV and a second UAV from a single location, the servicing including at least loading the first UAV with a package that includes one or more of the items.

11. The multi-level structure as recited in claim 6, further comprising an internal corridor accessible by at least one of the plurality of apertures, the internal corridor providing access by the UAVs to at least some of the different levels within the multi-level structure.

12. The multi-level structure as recited in claim 11, further comprising at least one of:

a lift assist mechanism located proximate to a bottom of the internal corridor, the lift assist mechanism to provide upward air movement through the internal corridor; or
an impact dampener located proximate to the bottom of the internal corridor, the impact dampener to reduce potential damage to a UAV that falls into the impact dampener.

13. The multi-level structure as recited in claim 6, wherein the apertures include an entry aperture and an exit aperture, the entry aperture providing access to a first internal corridor that provides access by the UAVs to different levels within the multi-level structure, the exit aperture providing an exit from a second internal corridor, and further comprising UAV passages connecting the first internal corridor to the second internal corridor, wherein the UAV service sites are located within the UAV passages.

14. The multi-level structure as recited in claim 6, wherein the UAV service sites are further configured to:
charge or replace a battery of a UAV, and
couple a package to the UAV.

15. The multi-level structure as recited in claim 6, further comprising a launch assist mechanism configured with the UAV service site, the launch assist mechanism to provide a trajectory force to a UAV during a launch of the UAV from the UAV service site.

16. The multi-level structure as recited in claim 6, further comprising an internal transport robot to move a UAV within the interior of the multi-level structure and to charge a power source of the UAV.

17. A multi-level unmanned aerial vehicle (UAV) landing structure comprising:
an exterior shell that includes coupling features extending outward from the exterior shell; and
a UAV platform to support landings and takeoffs of the UAVs, the a UAV platform coupled to the exterior shell, and the a UAV platform including a plurality of arms that selectively engage at least some of the coupling features and wherein the UAV platform includes a controller to move the UAV platform about the exterior shell.

18. The multi-level UAV landing structure as recited in claim 17, wherein the coupling features include power coupling components to provide power to the UAV platform as the UAV platform moves about the coupling features.

19. The multi-level UAV landing structure as recited in claim 17, further comprising apertures located in the exterior shell, the apertures to selectively open in response to positioning of a UAV platform proximate to an aperture.

20. The multi-level UAV landing structure as recited in claim 17, wherein the UAV platform is configured to raise a UAV readied for deployment to a higher location on the exterior shell than a location of a coupling of a package to the UAV.

* * * * *